United States Patent [19]

Arimilli et al.

[11] Patent Number: 5,909,698
[45] Date of Patent: Jun. 1, 1999

[54] CACHE BLOCK STORE INSTRUCTION OPERATIONS WHERE CACHE COHERENCY IS ACHIEVED WITHOUT WRITING ALL THE WAY BACK TO MAIN MEMORY

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 08/818,845

[22] Filed: Mar. 17, 1997

[51] Int. Cl.$^6$ ........................................ G06F 12/12
[52] U.S. Cl. ..................... 711/145; 711/141; 711/142; 711/143; 711/144
[58] Field of Search .................... 711/141, 142, 711/143, 144, 145, 133

[56] References Cited

U.S. PATENT DOCUMENTS

| | | | |
|---|---|---|---|
| 4,020,466 | 4/1977 | Cordi et al. ........................ | 707/201 |
| 4,780,808 | 10/1988 | Moreno et al. . | |
| 4,905,188 | 2/1990 | Chuang et al. . | |
| 4,991,090 | 2/1991 | Emma et al. . | |
| 5,347,639 | 9/1994 | Rechtschaffen et al. . | |
| 5,469,555 | 11/1995 | Ghosh et al. ........................ | 711/133 |
| 5,548,739 | 8/1996 | Yung . | |
| 5,627,992 | 5/1997 | Baror ................................. | 711/133 |

OTHER PUBLICATIONS

Motorola Inc. and IBM Corp., "PowerPC 603: RISC Microprocessor User's Manual", MPC603UM/AD, pp. 5–23 and 5–28, 1994.

Primary Examiner—Tod R. Swann
Assistant Examiner—Felix B. Lee
Attorney, Agent, or Firm—Casimer K. Salys; Daniel E. Venglarik; Andrew J. Dillon

[57] ABSTRACT

In a processor employing separate instruction and data caches in at least one cache hierarchy level, a cache control instruction forces modified data within the separate data cache to a lower cache hierarchy level. An existing cache access attribute is employed to distinguish between occasions when the data must be written all the way to main memory and occasions when the data need only be written to a cache hierarchy level from which fetches are made to the separate instruction cache. Thus, the separate instruction and data caches may be made coherent without writing all the way to main memory, but the ability to write modified data to main memory whenever necessary is preserved. Utilization of the existing attribute avoids increasing processor complexity and/or resources.

20 Claims, 6 Drawing Sheets

| Instr. | Cache block state | Cache access attrib. | Action | Bus op'n | Bus attrib. |
|---|---|---|---|---|---|
| dcbst (store) | M | G | Write block to main memory, mark cache block E | Write-with-kill | W or G |
| | M | $\overline{G}$ | Write block to common cache level, mark cache block I (or E) | Write-with-kill | $\overline{W}$ or $\overline{G}$ |
| | $\overline{M}$ | G | no-op | Clean | W or G |
| | $\overline{M}$ | $\overline{G}$ | no-op | Clean | $\overline{W}$ or $\overline{G}$ |

402  404  406  408  410  412

| Instr. | Cache block state | Cache access attrib. | Action | Bus op'n | Bus attrib. |
|---|---|---|---|---|---|
| dcbst (store) | M | G | Write block to main memory, mark cache block E | Write-with-kill | W or G |
| | M | $\overline{G}$ | Write block to common cache level, mark cache block I (or E) | Write-with-kill | $\overline{W}$ or $\overline{G}$ |
| | $\overline{M}$ | G | no-op | Clean | W or G |
| | $\overline{M}$ | $\overline{G}$ | no-op | Clean | $\overline{W}$ or $\overline{G}$ |
| 402 | 404 | 406 | 408 | 410 | 412 |

Fig. 4

CACHE BLOCK STORE INSTRUCTION OPERATIONS WHERE CACHE COHERENCY IS ACHIEVED WITHOUT WRITING ALL THE WAY BACK TO MAIN MEMORY

BACKGROUND OF THE INVENTION

1. Technical Field

The present invention relates in general to cache coherency in data processing systems and in particular to efficiently maintaining cache coherency in data processing systems having multiple caches of the same and/or different levels. Still more particularly, the present invention relates to an enhanced cache store protocol for forwarding store updates only as far as necessary to assure cache consistency.

2. Description of the Related Art

Current reduced instruction set computing (RISC) processors typically contain both instruction and data level one caches. Utilizing separate level one caches is necessary in view of the extreme bandwidth required in contemporary processors. Instruction fetches and data references in superscalar processors may easily exceed more than one cache access per cycle. Therefore, instruction and data references are issued to separate caches, one for data and one for instructions. Each level one cache is designed for access every cycle.

One problem with separate level one caches for data and instructions is that periodically a processor will modify data in the data cache which is determined to actually comprise instructions to be executed later. This may occur, for example, when a loader program resolves code linkages after loading the code into memory. The processor may have already fetched this data into the instruction cache, before the data was modified. However, most RISC processors do not include any mechanism for maintaining level one cache coherency; that is, changes in one are not automatically reflected in the other. Therefore, software executing in the processor is required to provide a mechanism for handling such situations. The problem is usually addressed by flushing any instructions in the data cache which have been modified and invalidating the same addresses which may be in the instruction cache. This is done for any lines which may have been changed (typically all of the lines within a program) one page at a time.

Most superscalar processors having separate level one caches support an instruction for forcing all modified data within a given cache block out of the level one data cache. In PowerPC™ processors, this instruction is a data cache block store (dcbst) instruction. When a dcbst instruction is executed, the effective address is computed, translated, and checked for protection violations. If the target cache block for this instruction does not contain modified data, the cache block is left unchanged and a clean operation is broadcast onto the bus. If modified (dirty) data is associated with the cache block, however, the processor pushes the modified data out of the data cache. All bytes in the cache block are written to main memory and the cache block is flagged "exclusive," indicating that the cache contains data at that address which is valid data shared with system memory, but other caches may contain incongruent data at the same address.

Other RISC processors support equivalent instructions for similar operations. Such instructions, however, are also used by programmers who wish to make the results of a modified line in the cache immediately visible outside the processor. This may be useful, for example, in making a graphics update to a memory mapped graphics adapter. Thus, the instruction provided to solve cache coherency problems by forcing data all the way to memory may also be used to force data to an I/O device. These disparate uses, however, are to some degree inconsistent in their objectives. Use of the dcbst or equivalent instruction for cache coherency need not write the data all the way to the lowest level in the cache hierarchy; merely writing the data to a point from which data fetched to the instruction cache derives would be sufficient.

It would be advantageous, therefore, to provide a mechanism for distinguishing dcbst or equivalent instructions intended to provide cache coherency from similar instructions intended to disseminate results of a modified cache line. It would further be desirable if mechanism did not add significantly to the operational complexity or resource requirements of the processor.

SUMMARY OF THE INVENTION

It is therefore one object of the present invention to provide an improved mechanism for maintaining cache coherency in data processing systems.

It is another object of the present invention to provide a mechanism for efficiently maintaining cache coherency in data processing systems having multiple caches of the same and/or different levels.

It is yet another object of the present invention to provide an enhanced cache store protocol for forwarding store updates only as far as necessary to assure cache consistency.

The foregoing objects are achieved as is now described. In a processor employing separate instruction and data caches in at least one cache hierarchy level, a cache control instruction forces modified data within the separate data cache to a lower cache hierarchy level. An existing cache access attribute is employed to distinguish between occasions when the data must be written all the way to main memory and occasions when the data need only be written to a cache hierarchy level from which fetches are made to the separate instruction cache. Thus, the separate instruction and data caches may be made coherent without writing all the way to main memory, but the ability to write modified data to main memory whenever necessary is preserved. Utilization of the existing attribute avoids increasing processor complexity and/or resources.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
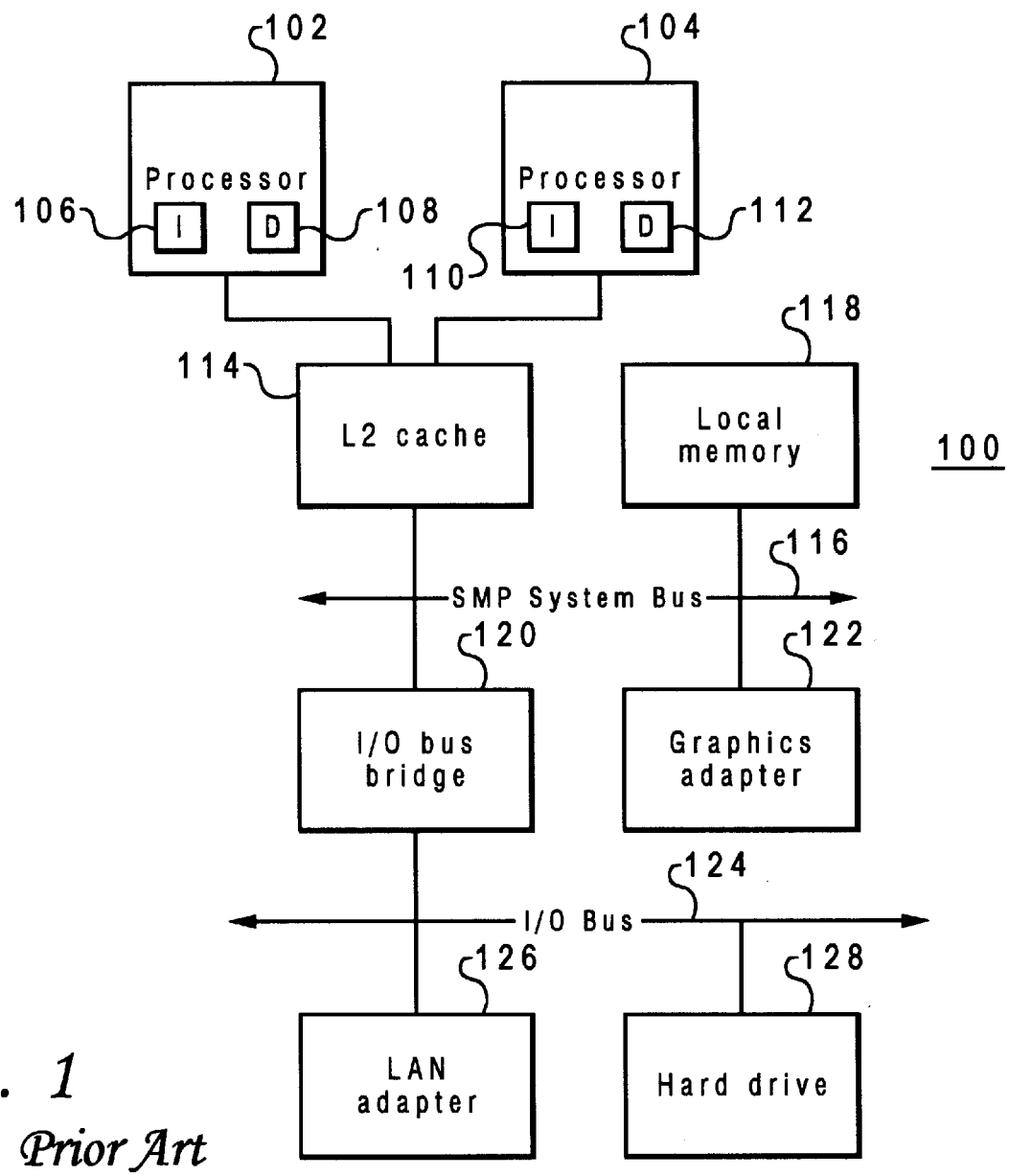
FIG. 1 depicts a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may include only a single processor or may be a symmetric multiprocessor (SMP) system including a plurality of processors 102 and 104. Processors 102 and 104 are superscalar RISC processors including separate level one instruction and data caches within the respective processors. Thus processor 102 includes instruction cache 106 and data cache 108, and processor 104 includes instruction cache 110 and data cache 112. The PowerPC™ processor may be utilized for processors 102 and 104.

Processors 102 and 104 are both connected to a common level two (L2) cache 114. L2 cache 114 is connected to SMP system bus 116. Local memory 118 is also connected to SMP system bus 116, as is I/O bus bridge 120. Other devices, such as memory-mapped graphics adapter 122, may also be connected to SMP system bus 116. I/O bus bridge 120 is connected to I/O bus 124, which may be connected to a variety of other devices such as local area network (LAN) adapter 126 and hard disk drive 128.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural imitations with respect to the present invention. In particular, although only two levels of cache hierarchy are depicted in FIG. 1, the present invention may be employed in data processing systems having additional caches between processors 102 and 104 and local memory 118.

Additionally, a data processing system need not have two processors as shown in the depicted example to benefit from the present invention. The present invention may be employed to improve the performance of a data processing system having only a single processor with separate level one caches. Alternatively, other devices maintaining separate caches and capable of accessing system memory may also be incorporated. As used herein, therefore, "multiprocessor" is used to describe a data processing system containing at least one other device, in addition to a processor, which maintains a separate cache, is capable of accessing system memory, and is capable of functioning as bus master, thus requiring cache coherency.

Figure 2:
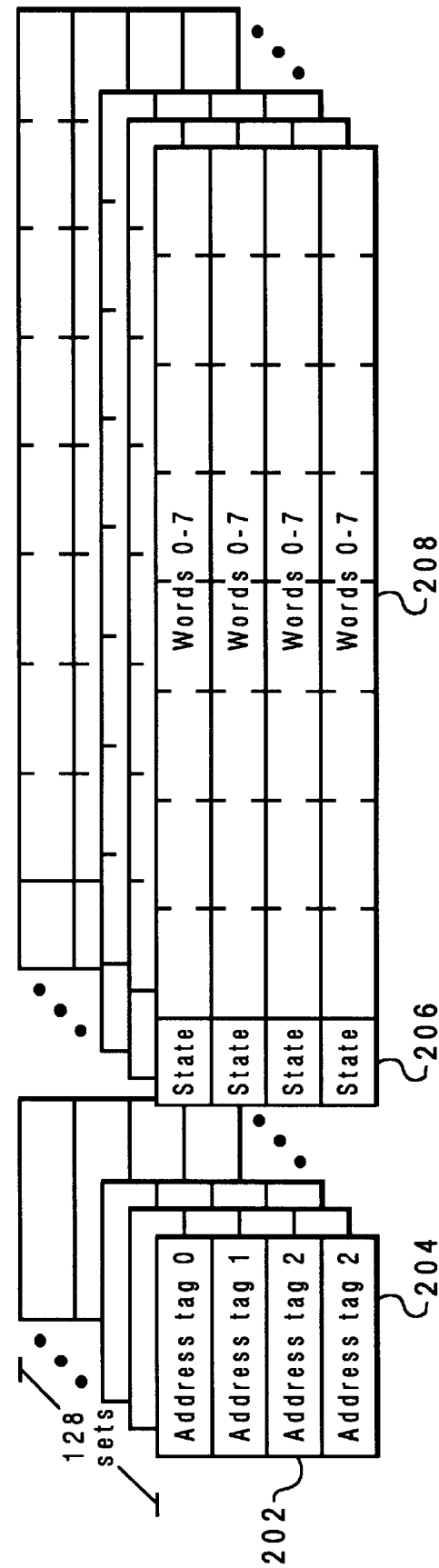
FIG. 2 is a diagram of cache memory organization in accordance with a preferred embodiment of the present invention.

Referring to FIG. 2, a diagram of cache memory organization in accordance with a preferred embodiment of the present invention is portrayed. The organization shown is employed by the PowerPC™ processor, although other superscalar RISC processors employ different organizations suitable for implementation of the present invention. Each page of cache memory includes cache blocks which are 8 words (32 bytes) in length. A cache block, also called a "cache line," is a block of memory which a coherency state describes. Cache block 202 includes a physical address tag 204 and a state field 206 in addition to the 8 words 208 of data. State field 206 indicates a coherency state of data within the corresponding cache block 202. For the PowerPC™ processor, state field 206 may indicate "modified," "exclusive," "shared," or "invalid" coherency states.

With reference now to FIGS. 3A through 3D, diagrams for relevant cache block coherency states in accordance with a preferred embodiment of the present invention are depicted. The "modified," "exclusive," "shared," and "invalid" cache block coherency states illustrated are employed by the PowerPC™ processor, although other superscalar RISC processors employ equivalent cache block coherency states suitable for implementation of the present invention.

Figure 3:
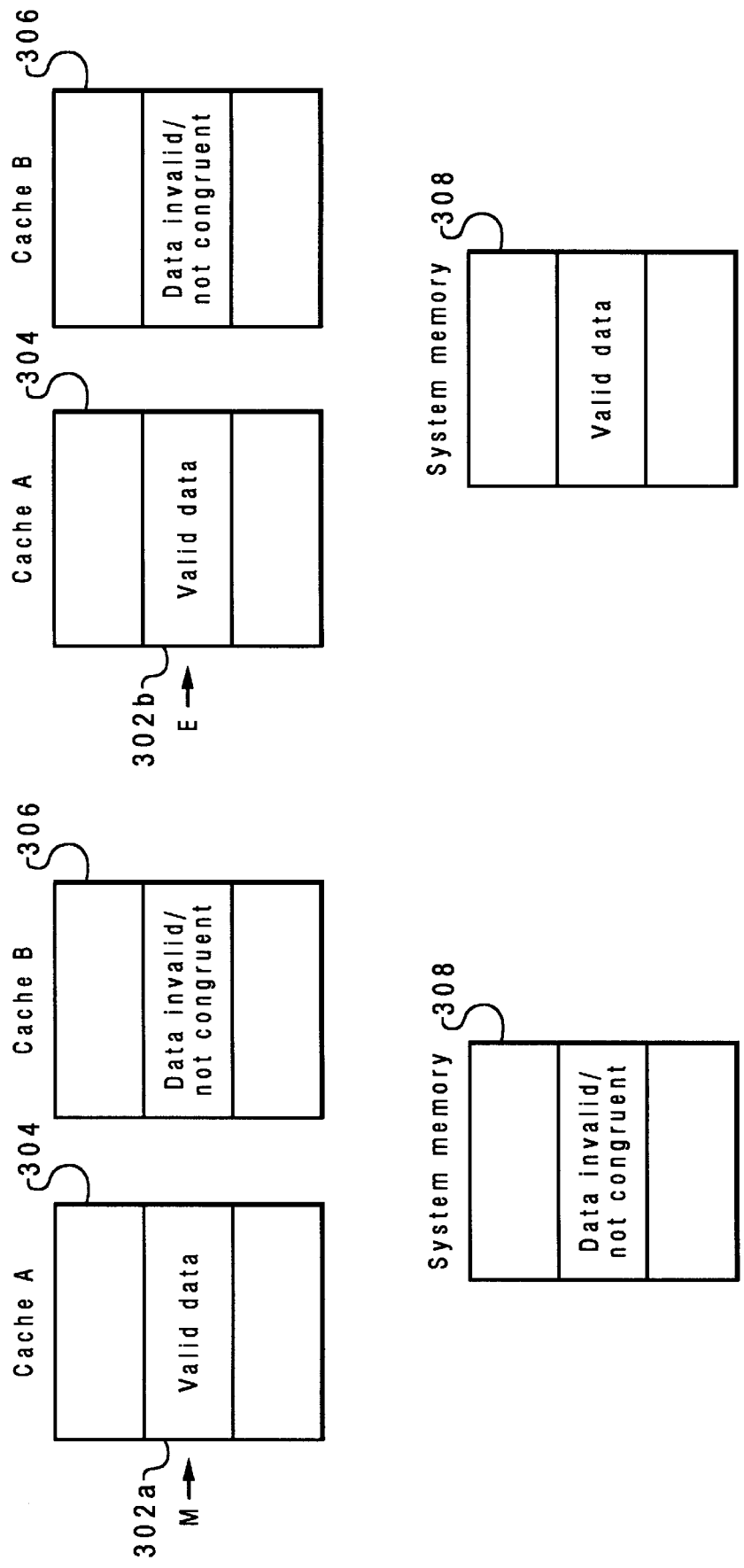
FIGS. 3A–3D depict diagrams for relevant cache block coherency states in accordance with a preferred embodiment of the present invention.

FIG. 3A illustrates the significance of the "modified" cache block coherency state. A cache block 302a within one cache (Cache A) 304 contains data corresponding to a specific address. Another cache (Cache B) 306 and the system memory 308 also contain data corresponding to the same address. A modified state indicator in the state field of cache block 302a indicates that the addressed data block is valid in cache 304, and only in cache 304. Cache block 302a contains data which has been modified after being loaded from system memory 308, and the modified data within cache block 302a has not been written back to system memory 308. Therefore, data corresponding to the same address within cache 306 and system memory 308 is invalid or incongruent with the data in cache block 302a.

FIG. 3B illustrates the significance of the "exclusive" cache block coherency state. Again, cache block 302b within cache 304 contains data corresponding to a specific address, and both cache 306 and system memory 308 also contain data corresponding to the same address. An exclusive state indicator in the state field of cache block 302b indicates that the addressed data block is valid only in cache 304 and in system memory 308. Cache block 302b thus contains data which has been modified after being loaded from system memory 308 and written back to system memory 308 after modification. However, data corresponding to the same address within cache 306 is invalid or incongruent with the data in cache block 302b. Where multiple levels of cache are employed, the exclusive state indicates that no other cache at the same level has the valid data.

FIG. 3C illustrates the significance of the "shared" cache block coherency state. A shared state indicator in the state field of cache block 302c indicates that the addressed data block is valid in cache 304 and at least one other cache, such as cache 306. The contents of cache block 302c in cache 304 is always consistent with the contents of system memory 308 for the corresponding address when the state field of cache block 302c contains a shared state indicator. That is, in the PowerPC™ processor the shared state refers to shared-unmodified; there is no shared-modified state. Other RISC processors, however, may support a shared-modified coherency state, which could be advantageously exploited by the present invention.

FIG. 3D illustrates the significance of the "invalid" cache block coherency state. An invalid state indicator in the state field of cache block 302d indicates that the addressed data block is not valid in cache 304 and/or that any data contained in cache block 302d is not considered useful. The congruence of data corresponding to the same address within cache 306 or system memory 308 with the contents of cache block 302d is therefore of no interest, and is not reflected by the invalid state indicator.

Figure 4:
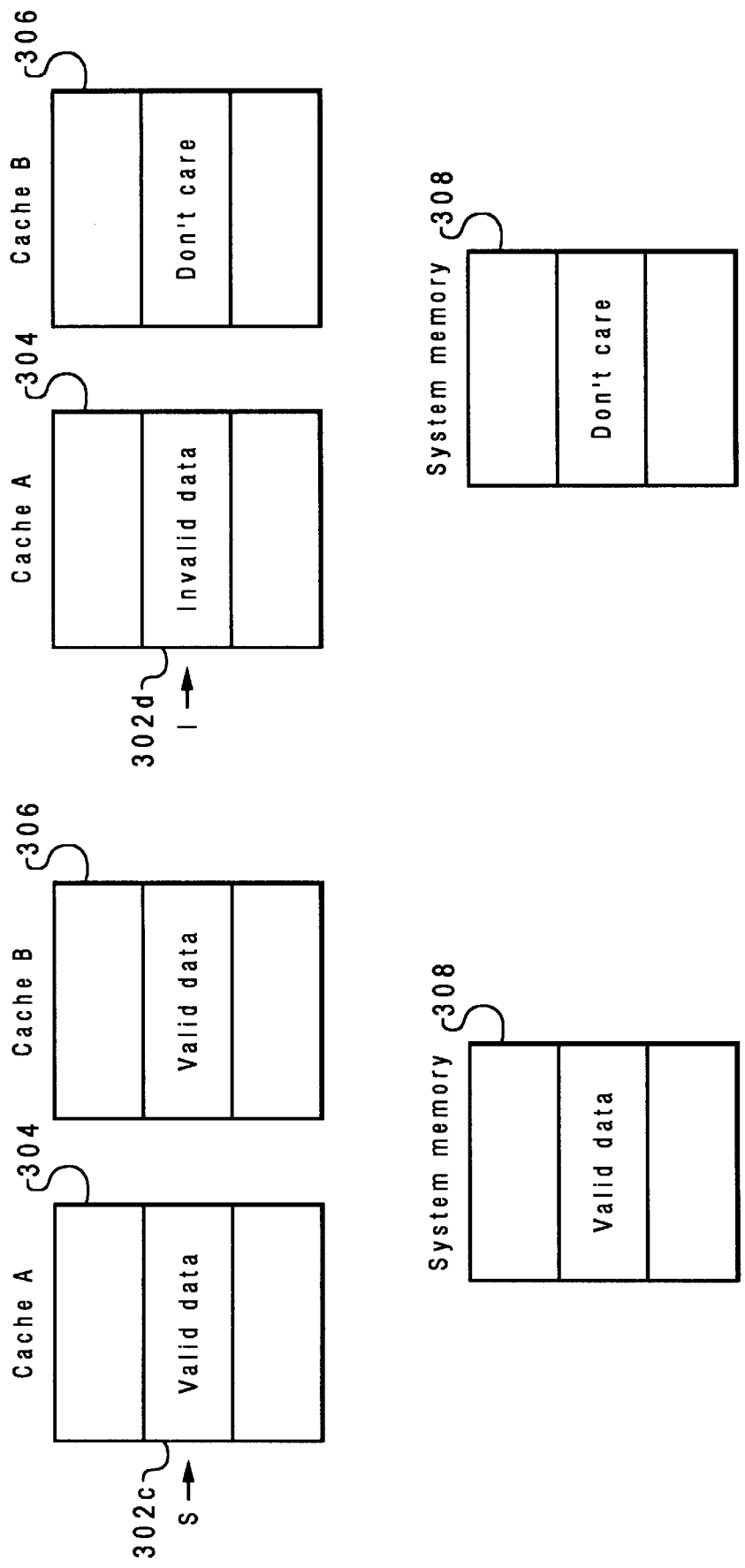
FIG. 4 is a table of cache control instructions in accordance with a preferred embodiment of the present invention.

Referring to FIG. 4, a table of cache control instructions in accordance with a preferred embodiment of the present invention is portrayed. As described earlier, most RISC processors include various cache control instructions, including a dcbst or equivalent instruction. Only so much of the cache control instruction set supported by the processor which is relevant to the present invention is shown in FIG.

4. Other cache control instructions supported by the PowerPC™ processor are unaffected by the present invention, although other RISC processors may require modifications to additional cache control instructions (other than just the dcbst equivalent) to successfully implement the present invention.

The operations initiated by a dcbst instruction 402 or equivalent instruction are dependent on the cache block state 404 of the target cache block and the cache access attribute 406 associated with the instruction. Attributes such as cache access attribute 406 are utilized to control memory and cache accesses. These attributes are typically programmed by the operating system for each page and block of memory and/or cache data. In architectures conforming to the PowerPC™ processor, three attributes or memory characteristics (W, I, M) may be set on a page or block basis, while one additional attribute (G) may be set on a page basis.

In the PowerPC™ architecture, all instruction and data accesses are performed under the control of four memory/cache access attributes: the write-through (W) attribute, which sets the write-through/write-back characteristic of a page or block; the cache-inhibited (I) attribute, which sets the cacheable/noncacheable characteristic of a page or block; the memory coherency (M) attribute, which sets the memory coherency enforced/not enforced attribute of a page or block; and the guarded (G) attribute, which sets the guarded storage characteristic of a page and allows both single- and multiple-processor data processing system designs to exploit various system-level performance optimizations. The W and I attributes control how the processor utilizes its own cache when performing an access. The M attribute ensures coherency is maintained for all copies of the addressed memory location. The G attribute prevents speculative loading and prefetching from the addressed memory location.

In the present invention, a dcbst instruction 402 or equivalent is modified based on a page access attribute. The page access attribute employed should be controlled by the operating system so that a programmer may identify whether the dcbst instruction is being issued to make instruction and data caches coherent or for a write to memory or a memory-mapped adapter. To avoid increasing the complexity of or resources required by the processor, an existing page access attribute should be utilized for this purpose. In the PowerPC™ architecture, the guarded or G access attribute satisfies these requirements. Other processor architectures may also have existing page access attributes which may be suitably utilized, or may require addition of a separate attribute.

The PowerPC™ architecture describes a memory page as guarded when it is used for I/O mapping. Thus, it is convenient to define a dcbst instruction issued to a cache block in a guarded memory page (identified by page table G attribute being set) as requiring that the data be written all the way to the lowest point in the cache hierarchy, the system memory or memory-mapped I/O device. A dcbst instruction issued to a cache block within a nonguarded memory page (identified by page table G attribute being off) would only require that the data be written to the cache hierarchy level where instruction and data caches are coherent. In the data processing system depicted in FIG. 1, and in most other data processing system designs, this is the level two cache. Only where the data processing system employs separate instruction and data caches in lower cache hierarchy levels need the data be written to a cache at level three or lower. The data may be written to the highest level cache ensuring instruction and data cache coherency following a subsequent fetch to the processor instruction cache.

Referring again to FIG. 4, only when the cache block which is the subject of the dcbst or equivalent instruction has been modified is internal action 408 by the processor required. If the cache block state 404 indicates that the block has been modified and the G access attribute 406 is set, the processor writes the cache block all the way to main memory and marks the cache block state "exclusive," indicating that the cache block contains data consistent with that found in the main memory. On the other hand, when the cache block state 404 indicates that the block has been modified and the G access attribute 406 is off, the processor only writes the cache block to a common cache level, from which fetches are made to separate instruction and data caches. The processor also marks the cache block state "invalid." Subsequent accesses to the same address will receive responses only from the other cache or device. A processor supporting a "shared-modified" state, as described above, may change the cache block state to that state instead.

The cache block written to a common cache level may alternatively be marked exclusive, as occurs when the page in not guarded. However, it has already been determined that the modified data within the cache block comprises an instruction. This is the reason the data was forced back to a common cache level. Therefore, there is no reason to retain the data in the separate data cache. Marking the data invalid therefore allows the data to be freely overwritten.

If the cache block to which a dcbst is issued does not contain modified data, the processor treats the instruction as a "no-op" and initiates no internal operation. The state of the G access attribute 404 is irrelevant to internal operations when the cache block has not been modified.

As with other processors designed to be utilized in multiprocessor systems, cache control instructions in the PowerPC™ processor may also initiate bus operations 410 to insure cache coherency with other caches. If the cache block state 402 indicates that the cache block has been modified and the cache access attribute 406 indicates that the page containing the cache block is guarded, the processor initiates a "write-with-kill" or equivalent bus operation when a dcbst or equivalent cache block store instruction is received. Another processor or device within the data processing system conforming to the PowerPC™ architecture will respond to a write-with-kill bus operation by snooping a common cache (such as a level two cache) for a copy of the addressed block. If a copy is found, the processor or device snoops its own cache and, if the addressed block is found, forces the addressed cache block state to invalid. The write queue to the common cache is also snooped, and a kill operation used to purge write queue entries containing copies of the addressed block.

If data within the target cache block has been modified and the page containing the cache block is not guarded, the processor again initiates a "write-with-kill" bus operation in response to receiving a cache block store instruction. Other processors or devices which are connected to the bus and conform to the PowerPC™ architecture will respond by forcing the addressed block to invalid state if found within the cache.

If the cache block addressed by a dcbst or equivalent instruction is not modified, the processor initiates a "clean block" or equivalent bus operation. A separate PowerPC™—compatible processor or device in the data processing system responds to a clean bus operation by pushing modified blocks within its own cache into main memory, marking the blocks E.

Each of the bus operations initiated by the processor in response to executing a dcbst or equivalent instruction should be accompanied by a mechanism signaling the intended nature of the instruction (i.e., write to main memory or write only to common level cache). Various mechanisms for indicating different semantics of a clean or write-with-kill bus operation may be utilized to distinguish the type of dcbst or equivalent instruction which initiated the write-with-kill or clean bus operation. The G access attribute may be simply passed along as a bus attribute 412 to the receiving processor or device, to be decoded accordingly. Alternatively, a different bus access attribute may be employed. For example, the write-through (W) attribute is presently forced on for a dcbst-initiated clean bus operation. Thus, the W attribute may be simply turned off when the data does not have to be written to all cache hierarchy levels (i.e., when the subject cache block is in a non-guarded memory page). Still another alternative would involve implementing a new version of the write-with-kill bus operation, with the appropriate version being initiated based on the state of the cache block page when a dcbst instruction is executed.

Figure 5:
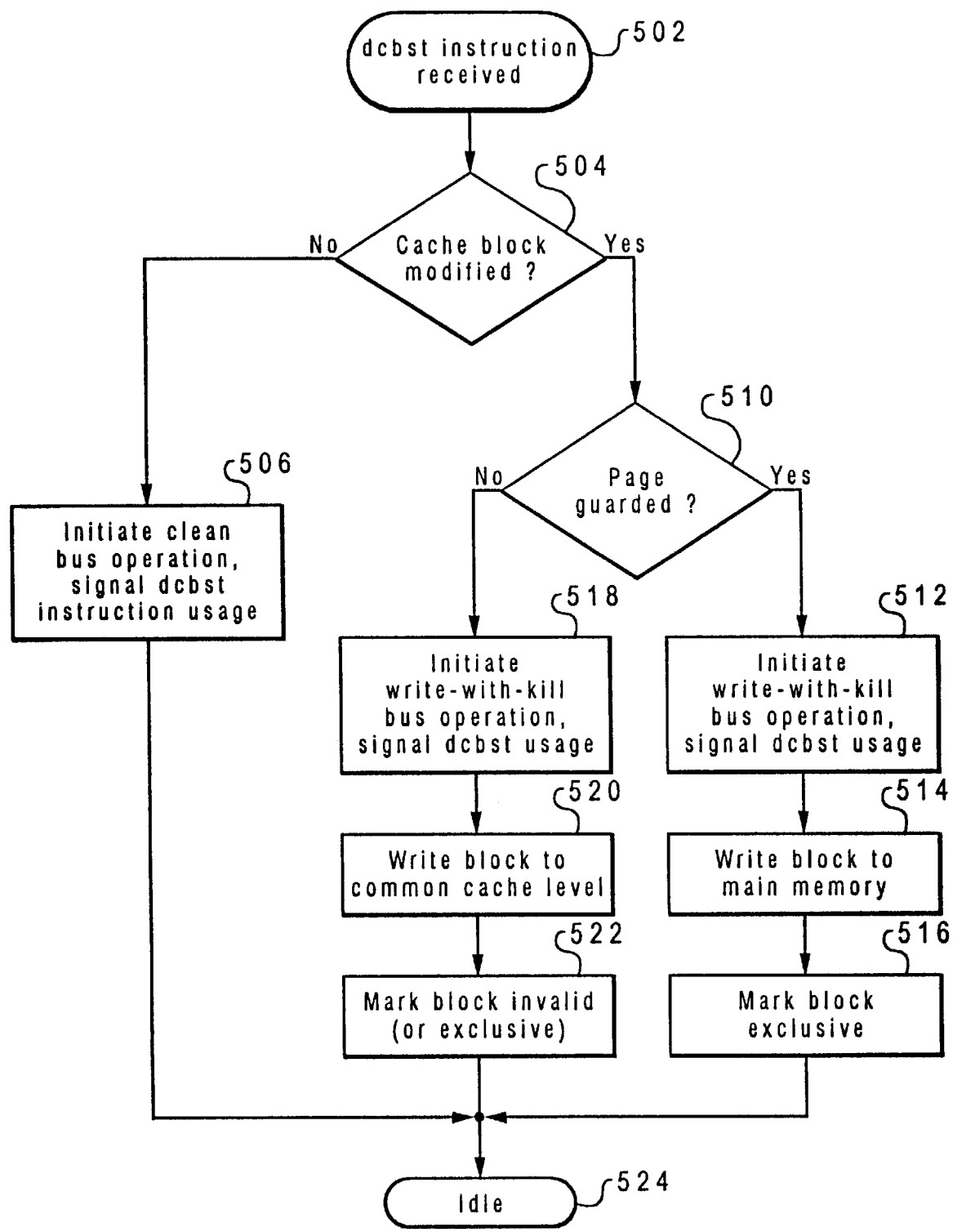
FIG. 5 depicts a high level flowchart for responding to a dcbst or equivalent instruction in accordance with a preferred embodiment of the present invention.

With reference now to FIG. 5, a high level flowchart for responding to a dcbst or equivalent instruction in accordance with a preferred embodiment of the present invention is depicted. The process is most useful in data processing systems containing separate instruction and data caches in at least one cache hierarchy level, and may be employed in multiprocessor systems. The process begins at step 502, which depicts receipt of a dcbst or equivalent cache block store instruction. The process then passes to step 504, which illustrates a determination of whether the cache block which is the subject of the instruction received contains data which was modified after being fetched from a lower level memory. If not, the process passes to step 506, which depicts initiating a clean bus operation or equivalent and signaling on the bus the intended usage of the cache block store instruction received. This signaling may be accomplished, for example, by either passing the guarded page access attribute with the clean bus operation or turning off the cache block write-through attribute, which is normally on for clean bus operations. The process then passes to step 524, which is described below.

Returning to step 504, if the cache block which is the target of the cache block store instruction contains modified data, the process passes instead to step 510, which depicts a determination of whether the page is "guarded" (i.e., whether the guarded page access attribute is set). A different mechanism may alternatively be employed to differentiate between cache block store instructions issued for cache coherency purposes and those issued to make modified data immediately visible. If the page containing the subject cache block is guarded, the process proceeds to first step 512, which illustrates initiating a write-with-kill bus operation. The process then passes to step 514, which depicts writing the subject cache block to main (or "system") memory, and next to step 516, which depicts marking the subject cache block as exclusive, or an equivalent state indicating that the cache contains data congruent with the addressed block in main memory but not congruent with any other cache. The process then passes to step 524, which is described below.

Returning to step 510, if the page containing the modified cache block to be pushed out was not marked guarded, the process proceeds instead to step 518. Step 518 illustrates initiating a write-with-kill bus operation to invalidate the addressed block within other caches. The process next passes to step 520, which depicts writing the cache block to a common cache level, from which data is fetched to both of the separate instruction and data caches or at which the separate instruction and data caches are coherent. In some data processing systems, this may be the main memory. The process then passes to step 522, which depicts marking the subject cache block invalid (or exclusive). If a cache block may be marked as containing data congruent with the addressed block in another cache but modified with respect to the addressed block in main memory, such a state may be alternatively indicated. The process finally passes to step 524, which illustrates the process becoming idle until the next cache block store instruction is received.

By differentiating between the alternative uses of data cache block store or equivalent operations, the performance of programs page-ins may be significantly improved without impacting the availability of the operation to write to memory or a device when required. Memory bandwidth is also improved, since the more prevalent usage of the operation is not required to write all the way to memory. Because an existing page access attribute may be employed, no additional complexity is added or additional resources required to distinguish between the different uses.

Although the preferred embodiment employs an existing cache attribute bit, alternative methods may be employed for differentiating between a cache block store instruction that should be written to main memory and a cache block store instruction that need only be written to a common level cache. For example, a separate instruction may be implemented to achieve the same effect.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of ensuring cache coherency in a data processing system employing a storage hierarchy having separate instruction and data caches at at least one level, comprising:

providing an instruction for copying modified data from a separate data cache to a memory within the storage hierarchy in the data processing system; and employing a memory access attribute to require the modified data to be written by the instruction to a main memory or memory mapped device when the memory access attribute is in a first state and allowing the modified data to be written by the instruction to a memory from which fetches are made to a separate instruction cache when the memory access attribute is in a second state, wherein separate instruction and data caches within the data processing system may be efficiently made coherent.

2. The method of claim 1, wherein the step of employing a memory access attribute further comprises:

responsive to receiving the instruction, determining a state of the memory access attribute; and responsive to determining that the memory access attribute is in the first state, writing the modified data to the main memory.

3. The method of claim 2, wherein the step of writing the modified data to the main memory further comprises:

writing the modified data to the main memory and any intervening memories in the storage hierarchy between the separate data cache and the main memory.

4. The method of claim 1, wherein the step of employing a memory access attribute further comprises:

writing the modified data to a memory mapped device.

5. The method of claim 2, further comprising:

responsive to determining that the memory access attribute is in the second state, writing the modified data to a memory in the storage hierarchy where an instruction cache is coherent with a data cache.

6. The method of claim 5, wherein the step of writing the modified data to a memory in the storage hierarchy further comprises:

writing the modified data to a cache from which fetches are made to the separate instruction cache.

7. The method of claim 5, wherein the step of writing the modified data to a memory in the storage hierarchy further comprises:

writing the modified data to a level two cache.

8. The method of claim 1, wherein the step of employing a memory access attribute further comprises:

responsive to receiving the instruction, determining a state of the memory access attribute; and responsive to determining that the memory access attribute is in the second state, initiating a bus operation for writing the modified data to a memory in the storage hierarchy where an instruction cache is coherent with a data cache.

9. An apparatus for ensuring cache coherency in a data processing system employing a storage hierarchy having separate instruction and data caches at at least one level, comprising:

instruction means for copying modified data from a separate data cache to a memory within the storage hierarchy in the data processing system; and memory control means for employing a memory access attribute to require the modified data to be written by the instruction means to a main memory when the memory access attribute is in a first state and allowing the modified data to be written by the instruction means to a memory from which fetches are made to a separate instruction cache when the memory access attribute is in a second state, wherein separate instruction and data caches within the data processing system may be efficiently made coherent.

10. The apparatus of claim 9, wherein the memory control means further comprises:

determination means, responsive to receiving the instruction, for determining a state of the memory access attribute; and data copying means, responsive to determining that the memory access attribute is in the first state, for writing the modified data to the main memory.

11. The apparatus of claim 10, wherein the data copying means further comprises:

means for writing the modified data to the main memory and any intervening memories in the storage hierarchy between the separate data cache and the main memory.

12. The apparatus of claim 10, wherein the data copying means further comprises:

means for writing the modified data to a memory mapped device.

13. The apparatus of claim 10, further comprising:

second data copying means, responsive to determining that the memory access attribute is in the second state, for writing the modified data to a memory in the storage hierarchy where an instruction cache is coherent with a data cache.

14. The apparatus of claim 13, wherein the second data copying means further comprises:

means for writing the modified data to a cache from which fetches are made to the separate instruction cache.

15. The apparatus of claim 13, wherein the second data copying means further comprises:

means for writing the modified data to a level two cache.

16. The apparatus of claim 9, wherein the memory control means further comprises:

determination means, responsive to receiving the instruction, for determining a state of the memory access attribute; and data copying means, responsive to determining that the memory access attribute is in the second state, for initiating a bus operation for writing the modified data to a memory in the storage hierarchy where an instruction cache is coherent with a data cache.

17. A computer program product for use with a data processing system employing a storage hierarchy including separate instruction and data caches at at least one storage hierarchy level, comprising:

a computer usable medium;

an instruction on the computer usable medium for copying modified data from a separate data cache to a memory in the storage hierarchy, the instruction copying the modified data to a main memory when a memory attribute is in a first state, and the instruction copying the modified data to a memory in the storage hierarchy from which fetches are made to a separate instruction cache when the memory attribute is in a second state, wherein separate instruction and data caches within the data processing system may be efficiently made coherent by the instruction.

18. The computer program product of claim 17, wherein the computer usable medium is a hard disk drive.

19. The computer program product of claim 17, wherein the computer usable medium is a floppy disk.

20. The computer program product of claim 17, wherein the computer usable medium is a CD-ROM.

* * * * *